United States Patent [19]

Wolford et al.

[11] Patent Number: 4,731,247

[45] Date of Patent: Mar. 15, 1988

[54] ARTIFICIAL FISH BAITS WITH SUSTAINED RELEASE PROPERTIES

[75] Inventors: Troy D. Wolford; George K. Greminger, Jr., both of Midland, Mich.

[73] Assignee: The Dow Chemical Company, Midland, Mich.

[21] Appl. No.: 765,017

[22] Filed: Aug. 9, 1985

Related U.S. Application Data

[63] Continuation-in-part of Ser. No. 535,491, Sep. 26, 1983, abandoned.

[51] Int. Cl.$^4$ ............................................ A01N 17/14
[52] U.S. Cl. ......................................... 426/1; 426/643
[58] Field of Search ...................... 426/1, 2, 643, 807; 119/1

[56] References Cited

U.S. PATENT DOCUMENTS 3,875,302  4/1975  Inoue ..................................... 426/1

FOREIGN PATENT DOCUMENTS 0054593   5/1978  Japan ..................................... 426/1
0143595  12/1978  Japan ..................................... 426/1

*Primary Examiner*—R. B. Penland

[57] ABSTRACT

Artificial baits are disclosed which slowly release a fish attactant into the water upon use. Said artificial baits comprise a water-soluble cellulose ether, a plasticizer therefore and an attractant for fish or other sea-living animals. Said artificial bait can be employed in a variety of forms suitable for sport fishing, commercial fishing, lobster trapping, and the like.

21 Claims, No Drawings

ARTIFICIAL FISH BAITS WITH SUSTAINED RELEASE PROPERTIES

CROSS-REFERENCE TO RELATED APPLICATION

This is a continuation-in-part of copending U.S. application Ser. No. 535,491, filed Sept. 26, 1983 now abandoned.

BACKGROUND OF THE INVENTION

This invention relates to artificial baits for fish and other aquatic animals, more particularly to artificial baits which slowly release attractants for fish or other aquatic animals into the surrounding water upon use.

Most, if not all, techniques for catching fish or other water-living animals such as shell fish, employ a bait or other attractant to which the desired species is attracted. Typically, said bait is of natural origin, i.e., animal or plant material. While such natural baits are widely used, largely because they are low in cost, such natural baits are quite inefficient in attracting the desired fish or other species. As a result, much of the natural bait used does not lead to the capture of the desired fish or other animal species.

Recently the availability of natural baits has decreased while the cost thereof has been increasing rapidly. The use of mechanical equipment for baiting hooks has created a need for an uniformly shaped bait form that is easily handled by the mechanical equipment used in commercial fishing operations. Natural baits also decompose rapidly and an artificial bait would provide convenience, storage stability, and would eliminate the problems of disposal of unused natural baits.

For this reason, in recent years there has been an effort to produce an artificial bait which is more effective in catching fish or other aquatic animals. For example, artificial lures made to resemble insects, small fish, shrimp or other natural prey of the species to be caught are widely used to catch certain types of fish. Such lures operate mainly by visually stimulating the target species. While such lures work very well for catching certain types of game fish, their use is not widely applicable to most major food fishes or for catching shellfish, crustaceans or other sea animals.

It has been found that for many species, including major food fishes, the most highly effective baits are those which are smelled by the animal to be caught. Accordingly, there have been developed sprays and other formulations which may be applied to natural or plastic baits in order to impart thereto a smell to which the fish is attracted. Unfortunately, however, these sprays and the like are not sufficiently long lasting for most applications, in particular commercial fishing, and tend to wash off the natural bait or other substrate to which they are applied.

It has previously been attempted to formulate the attractant into a solid matrix from which it is released during use. Unfortunately, such solid formulations generally employ a mixture of expensive natural gums which are difficult to obtain and very difficult to form into the desired shape. Furthermore, the physical properties of said gums, including their lack of thermoplasticity, renders said solid baits unsuitable in many applications, and difficult to use in any case. In addition, such baits employ nonwater soluble gums, which do not always release the attractant as readily as desired.

It would, therefore, be highly desirable to provide a solid artificial bait from which an olfactory stimulant for the fish is slowly released upon immersion of the bait in water, and which is substantially stable during storage at ambient temperatures. It would be further desirable to provide artificial bait which can be readily shaped into a variety of physical forms, which bait is adaptable to catch many species of fish or other aquatic animals, as well as to provide diverse modes of catching said species.

SUMMARY OF THE INVENTION

The present invention is a sustained release anhydrous artificial bait for fish or other water-living animal. This artificial bait comprises (a) a normally solid polymeric material comprising a matrix-forming amount of a water-soluble polymer composition and an effective amount of a plasticizer for said polymer, and (b) a functionally effective amount of an attractant for fish or other water-living animal. Upon immersing the bait in water, the attractant can be released in active form.

Preferably, the invention is a sustained release anhydrous artifical bait for fish or other water-living animal comprising (a) a normally solid polymeric material comprising (i) a matrix-forming amount of a non-thermoplastic, water-soluble cellulose ether composition, and (ii) an effective amount of a temperature activated plasticizing solvent for said cellulose ether; and (b) a functionally effective amount of an attractant for fish or other water-living animal. Upon immersing the bait in water, the attractant is gradually released in active form.

As used herein "sustained release" means that the attractant is gradually released into the medium over an effective period of time. An effective period of time is a time sufficient to attract the target species. The attractant is "gradually released" when it takes longer to release from the bait of this invention than if it was added itself to the water.

The artificial baits of this invention are particularly suitable for the sustained and prolonged release of an olfactory fish attractant into surrounding water. The bait is also substantially stable during storage at ambient temperatures. In addition, the artificial bait of this invention can be readily shaped into and employed in a variety of forms which are suitable for all forms of fishing such as sport fishing, commercial fishing, ocean fishing and fresh water fishing, as well as for catching shell fish and crustaceans such as lobsters, crabs, shrimp and the like.

DETAILED DESCRIPTION OF THE INVENTION

The present invention is a sustained release anhydrous artificial bait for fish and other water-living animals such as shell fish and the like. By "anhydrous" is meant that no water is present in, nor preferably, is employed in preparing the artificial bait composition of this invention. The artificial bait of this invention comprises a polymeric material, as described hereinafter, and an attractant for the fish and/or other animal. An anhydrous bait facilitates forming of the bait, and storing the bait. The attractant is gradually released from said artificial bait when the bait is immersed in water.

It will be readily recognized that the artificial bait of this invention can be formed into many desirable shapes and forms for which those particularly described herein are only illustrations.

The artificial bait of this invention can be subjected to a variety of forming methods and can be formed into any convenient size or shape. For some applications the artificial bait can be in the form of a strip which can be attached to the hook, line, net, trap or other device being employed. Said strip can have any dimensions consistent with the requirements of its intended use. In general, however, said strips can have a minimum thickness of about 1/16 inch and more typically can be from about 2/32 inch to ¼ inch thick.

The parts of this invention can also be formed into a tubular shape which is adapted, for example, to cover the shank of a fishhook. The dimensions of said tubular bait, in particular, the inside and outside diameter thereof, are chosen to provide the required physical strength, size and attractant release profile. The inside diameter is typically such that when the bait is pulled over the barb of a fishhook, it will remain on the shank of the fishhook during use. The outside diameter of the tubular bait is chosen to provide the bait with sufficient thickness to provide adequate strength as well as good release properties. Typically, the tubular bait has a thickness of between 1/16 inch and ⅜ inch.

The bait of the invention can be, if desired, formed into the shape of a worm, insect, small fish, shellfish or other natural prey of the target species, as well as comprise a segment of such a shaped bait or lure. Long cylindrical "worm" shapes of about ¼ inch to ¾ inch diameter are particularly popular among sports fisherman. For commercial fishing, cylindrical "ropes" of about ¼ inch to 1 inch in diameter are suitable. A process is an example of a suitable process for forming such products.

For baiting lobster traps and the like, the bait is advantageously simply contained in a small open can or other container.

The polymeric material employed herein is a normally solid material containing a matrix-forming amount of a water-soluble polymer composition which can form a matrix to incorporate the amount of a fish attractant. Upon contacting an aqueous medium, the water-soluble polymer dissolves and gradually releases the attractant. By "normally solid" is meant that the polymeric material is a solid under conditions of ordinary storage of the material, such as, for example, about 23° C. and 760 mm Hg pressure. Preferably, the polymeric material dissolves slowly in water (e.g., for at least one hour). Especially useful herein are polymeric materials which, when immersed in water, form a hydrated gel-like layer on the wetted surface, which hydrated layer slowly erodes over a period of time. In such polymer, the formation of such hydrated layer helps to retard the wetting of the interior portions of the artificial bait thereby slowing the release of the fish attractant contained therein. The hydrated layer also permits the fish attractant in said artificial bait to diffuse slowly out into the surrounding water. Examples of suitable water-soluble polymer compositions are the water-soluble cellulose ethers and polyvinyl alcohols.

For the preparation of shaped artificial baits, it is also preferable to employ a polymeric material which is capable of being extruded into the desired shape at temperatures which are sufficiently low that the fish attractant coextruded therewith is not degraded or inactivated. Many of said fish attractants comprise amino acids, enzymes or proteins which are not stable at elevated temperatures. Accordingly, the polymeric material is preferably one which can be coextruded with the fish attractant at a temperature generally from about 75° to about 190° C., preferably from about 75° to about 120° C.

Water-soluble cellulose ethers suitably employed herein include methylcellulose, hydroxypropyl methylcellulose, ethyl hydroxyethyl cellulose, hydroxypropyl cellulose, and the like. Preferably, the water-soluble polymer is a non-thermoplastic cellulose ether. Such a cellulose ether is one which is not itself thermoplastic, but requires a plasticizing solvent to render it thermoplastic. Without employing the plasticizing solvent, non-thermoplastic cellulose ethers remain a powder and can degrade or burn at thermoforming temperatures. Of these, hydroxypropyl methylcellulose is preferred due to its thermoplasticity in a suitable solvent its ability to readily hydrate to form a gel layer thereby sustaining the release of the fish attractant.

The molecular weight of the aforementioned cellulose ether may vary widely as long as the resultant artificial bait is solid and sustains the release of the fish attractant therefrom over the required period. In some applications, such as sport fishing, the artificial bait is generally in use for a relatively short period, i.e., 15 minutes to two hours. Accordingly, the release of attractant is most advantageously sustained over a similar period. In other applications, a longer period of use is typically encountered. For example, commercial fishing generally requires a bait which can release attractant over a 2 to 20, more typically a 6 to 15, hour period. Lobster baits ideally exhibit a useful life of about 3 to 5 days. Since the molecular weight of the polymer impacts upon the useful life of the bait, in general it is preferred to use the high molecular weight polymer in applications where a longer useful life is required. Cellulose ethers exhibiting a viscosity as a 2 weight percent aqueous solution of 100 to 100,000, preferably 1,000 to 100,000, centipoises at 20° C. are suitably employed in this invention. However, for those baits requiring a longer useful life, the more viscous materials, i.e., those having a 2 percent solution viscosity of 15,000 centipoises or higher are preferred.

In addition to increasing the useful life of the artificial bait, increasing the molecular weight of the cellulose ether generally improves the toughness and elasticity of the bait. Thus, when toughness is a desired characteristic of the bait, as when the bait is to be pierced by a fish hook, the use of high molecular weight cellulose ether is preferred.

Cellulose ethers employed herein are advantageously temporarily crosslinked with glyoxal or other dialdehyde. Such crosslinked cellulose ethers often exhibit, in bait form, improved strength and toughness as compared to the corresponding non-crosslinked cellulose ethers.

The polymeric material employed herein also comprises a plasticizer for the water-soluble polymer composition. In view of the fact that the preferred cellulose ethers are not in themselves thermoplastic, a temperature-activated plasticizing solvent is employed. Such a solvent is one which is a solvent for the cellulose ether at an elevated temperature, but is not a solvent for the polymer at ambient temperatures such as, for example, from about 20° to about 30° C., i.e., the cellulose ether is substantially soluble in the solvent at elevated temperatures, and substantially insoluble in the solvent at ambient temperatures. At elevated temperatures, the cellulose ether/plasticizer solution provides a thermoplastic composition. As used herein, "solvent" and "solution"

refer to mixtures of the polymer and solvent in which the molecules of the polymer are individually dispersed throughout the solvent; colloidal mixtures in which small aggregates of the polymer are dispersed throughout the solvent; and miscible mixtures in which the molten polymer is miscible with the solvent; although any mixture of polymer and plasticizing solvent which is thermoplastic is suitable. Such a composition can be thermoformed at a suitable temperature below that at which the attractant degrades. Such plasticizer is a material which is compatible with the water-soluble polymer composition and which (a) reduces the softening point of the cellulose ether and/or (b) imparts more desirable physical properties (i.e., flexibility and toughness) to the polymeric material.

Plasticizers for cellulose ether, particularly for hydroxypropyl methylcellulose, are well known and include materials such as ethylene glycol, propylene glycol, 1,2-butylene glycol, 2,3-butylene glycol, diverse diols such as 1,3-propanol, 2,3-pentane diol, low molecular weight polyethylene glycols, (especially those which boil at less than about 500° C.), diverse glycol ethers, esters of fatty acids and the like. The plasticizer is employed in an effective amount sufficient to solubilize the amount of polymer to render it thermoplastic at the forming temperatures and to impart to the polymeric material the desired physical properties. Such amount can vary, and typically ranges from about 0 to about 80, preferably from about 40 to about 80, percent by weight of the polymeric material, although any functional amount is suitable.

Preferred plasticizers are those in which the cellulose ether or polyvinyl alcohol become miscible at temperatures between about 95° to about 120° C. Preferably, propylene glycol or ethylene glycol are employed with cellulose ethers because of their hot solvent properties. However, plasticizers in which the cellulose ether or polyvinyl alcohol only become miscible at somewhat higher temperatures, i.e., 150° C. can be employed herein if the artificial bait is prepared in a stepwise process. In said stepwise process, the plasticizer and cellulose ether or polyvinyl alcohol are first blended at the higher temperature and then cooled to a temperature below about 120° C. at which the blended material remains soft or semi-solid. The attractant is then added to the softened material in a separate step. Glycerol acetate is an example of a plasticizer which can be employed in such a stepwise fashion.

In an especially preferred embodiment of this invention, which is particularly useful in shaped baits which are to be attached to fish hooks, the polymeric material comprises a cellulose ether having a hydroxypropoxyl content of 7-32 weight percent and a methoxyl content of 16-30 weight percent, which is plasticized with about 60-80 weight percent (based on polymer plus plasticizer) of propylene glycol or ethylene glycol. In such embodiments, hydroxypropyl methylcellulose having a hydroxypropoxyl content of 23-32 percent and a methoxyl content of 16-20 percent is particularly preferred. Such especially preferred polymeric material exhibits an excellent attractant release profile, has a texture which closely resembles that of conventional natural and artificial shaped baits, is substantially stable under conventional storage conditions and is sufficiently tough to permit it to be impaled on a fish hook during use.

The attractant employed herein is any sensory stimulant for the target species which is capable of being incorporated into the polymeric material, maintaining its activity under forming conditions and being released in active form therefrom. Preferred attractants include olfactory stimulants. Suitable such attractants include liquified fish or other marine products, fish oils, anise, amino acids or synthetic attractants.

Natural baits, such as squid, shrimp, bunker, or waste fishes or fish parts normally disposed of in fishing operations, such as fish heads, shrimp heads, carcasses, trash fish, trash invertebrates and the like may all be employed to prepare attractant mixtures.

In addition, attractants can be prepared following the procedure disclosed in Carr et al., *COMP. BIOCHEM. PHYSIOL.*, Vol. 54A, pp. 161-166; 437-441 (1976); Carr et al. *COMP. BIOCHEM. PHYSIOL.*, Vol. 55A, pp. 153-157 (1976) and Carr et al. *COMP. BIOCHEM. PHYSIOL.*, Vol. 58A, pp. 69-73 (1977).

Said attractant is employed in a functionally effective amount, i.e., an amount sufficient to be incorporated into the polymeric matrix, and which can provide the release over a time sufficient to attract the target. Such an amount can vary and typically ranges from about 2 to about 40 percent based on weight of polymeric material. Greater than about 40 percent attractant, based on weight of polymeric material, causes the bait to have poor physical properties. Thus, for shaped baits where physical strength is an important parameter, it is generally desirable to employ less than about 40 percent attractant. Preferably, from about 5 to about 40, more preferably from about 5 to about 20, most preferably from about 2 to about 20 percent, by weight attractant based on weight of polymeric material are employed, although any effective amount can be employed. In other bait forms such as lobster bait, where physical strength is not important, somewhat higher levels of attractant may be employed if desired. In general, however, the bait will not contain more than about 50 percent of attractant based on weight of polymeric material.

In addition to the polymeric material and attractant, the baits of this invention may employ dyes, stabilizers, mold release agents and like additives for their conventional purposes.

One especially useful additive is salt (sodium chloride) or other electrolyte, which may, optionally, be employed in an amount from about 0 to about 15, preferably from about 0 to about 5, percent of the combined weights of polymeric material and salt. The presence of said salt or other electrolyte often increases the rate of diffusion of water into the artificial bait, thereby increasing the rate of release of attractant from the artificial bait. In addition, said salt or electrolyte sometimes softens the artificial bait.

Similarly, inorganic or organic fillers such as tricalcium phosphates and aluminum sulfate may be incorporated into the bait. Said filler will typically have the effects of increasing the stiffness and strength of the bait, while also increasing the rate of release of attractant therefrom.

Fibrous filler, such as fiberglass fibers, cloth fibers, plastic fibers, cellulose pulp and the like can be employed to improve the physical strength of the bait, if desired. Such fibers can also be employed as a casing material to enclose the polymeric material and attractant mixture. The bait thereby can resemble a sausage in form.

The preparation of the artificial baits of this invention can vary somewhat according to the particular characteristics desired in the final product. In general, the artificial baits of this invention are prepared by providing a mixture, blend or solution of the polymeric material and the attractant and then forming the mixture, blend or solution into a desired shape.

In the preparation of strips of artificial bait, the strip may be formed by coextruding the polymeric material and attractant into the desired shape, or forming a film of the polymeric material and attractant from a solution thereof. Suitable extrusion conditions are described hereinbelow. Film-forming can be achieved by dissolving the polymeric material and attractant into a suitable solvent such as water, methylenechloride, forming a film therefrom, and drying the film. Alternatively, the blended attractant and polymeric material may be formed into films as a solventless hot melt and subsequently cooled to obtain the desired bait film. In said film formation, the artificial bait is advantageously, but not necessarily, coated onto or laminated to a flexible substrate which is employed to add mechanical strength to the strip. Said substrate is advantageously a woven material such as cloth, particularly gauze, or a plastic material, but may be any material which provides the desired mechanical properties to the bait.

Preparation of shaped baits (i.e., worms, insects, hollow baits and the like) is advantageously performed by an extrusion technique. In said technique, the polymeric material and attractant are thoroughly mixed and melted in an extruder and then molded or otherwise formed into the desired shape. Said extrusion technique is preferably conducted relatively quickly and at relatively low temperatures because of the tendency of the fish attractant to become degraded or inactivated at elevated temperatures. In general, said extrusion is performed at less than 120° C., preferably less than 110° C., more preferably between 75° to 110° C., for a period of less than about 10, preferably less than about 5, more preferably less than about 3, minutes.

As is evident from the foregoing, various parameters may be manipulated to obtain the desired release profile. The amount of cellulose ether employed can be varied somewhat, with release rates generally increasing as the cellulose ether content decreases. The optional inclusion of salt, electrolyte or filler also affects the release rate. Similarly, increasing the level of attractant also generally increases the rate of release. Alterations of the size and shape of the bait also can affect the release of attractants therefrom.

In addition, the rate of release can be altered by incorporating varying levels of attractant in the exterior and interior regions of the artificial bait. In general, the attractant at the exterior portions of the bait is released more quickly than that of the interior portions. Accordingly, a fast release can be obtained by concentrating the attractant at the exterior portions of the bait. Conversely, a delayed release is obtained by placing the major amount of attractant on the interior of the bait.

A bait having the attractant concentrated at its exterior portions is advantageously prepared by extruding the polymeric material, with or without attractant, and before cooling the extruded polymeric material, contacting the surface thereof with the attractant, such that only the exterior portions of the polymeric material absorb the attractant. Alternatively, the bait can be prepared by forming the interior of the bait in a first step and then, in a second step, coating the interior of the bait with additional polymeric material containing attractant.

Conversely, baits having the principal portion of attractant on the interior portions are advantageously prepared by first forming an interior portion containing a major amount of attractant, and then coating said interior portions with additional polymeric material containing little or no attractant.

Another method of preparing the artificial baits of this invention employs microwave radiation. In this process, the mixture of cellulose ether, plasticizer, attractant, filler and other optional ingredients are placed in a microwave container. The container and mixture are placed in a microwave oven and subjected to a sufficient temperature for a sufficient period of time. Again, the temperature is less than that at which the attractant degrades. A solid, rubbery artificial bait in the form of a cake is provided.

The artificial bait of this invention is employed in the same manner as natural baits or conventional artificial baits. This artificial bait may be employed to bait fish hooks, fish or shellfish nets, lobster or other traps, or in any other suitable means for catching a desired species. The artificial baits of this invention are useful for catching fish or other aquatic animal species indigenous to fresh or salt water. Moreover, such baits provide for the gradual release of the attractant upon contact with water, but are substantially stable during conventional packaging and shelf storage.

The following examples are provided to illustrate the invention but not to limit the scope thereof. All parts and percentages are by weight unless otherwise indicated.

EXAMPLE 1

A slurry containing 101.25 g of propylene glycol, 33.75 g of hydroxypropyl methylcellulose (methoxyl content=16.5-20 percent; hydroxypropoxyl content=23-32 percent; 2 percent solution viscosity=5,000 centipoises) and 15 g of fish attractant (a mixture of amino acids stabilized with absorbic acid) is prepared by simple mixing. The slurry is then fed into an extruder containing four heat zones and set at 100°, 110°, 110° and 85° C., respectively. The total residence time of the slurry in the extruder is less than 3 minutes. The slurry is extruded into "ropes" of 3/16 inch diameter and varying lengths. The extruded product is clear and has a solid, but limp appearance. In addition, the product exhibits a noticeable odor of fish attractant.

The resulting product is found to be stable at room temperature and sufficiently strong to withstand axial penetration by a fish hook without tearing or breaking.

The effectiveness of this artificial bait is tested by immersing a portion thereof into tanks containing diverse fish species, including grouper and flounder. In all tests, the fish are strongly attracted to the artificial bait.

EXAMPLE 2

Example 1 is repeated, this time employing the same fish attractant except that it is stabilized with potassium sorbate. Equivalent results are obtained.

EXAMPLE 3

Example 1 is again repeated, this time employing a hydroxypropyl methylcellulose which is lightly crosslinked with glyoxal. The resulting product turns black upon extrusion, apparently due to an interaction between the attractant and the glyoxal crosslinks. However, this product is tougher than that of Example 1, is stable, and exhibits equally good ability to attract fish.

EXAMPLE 4

The mixture of Example 1 is again prepared, this time employing, in addition to the other ingredients, 3 g of ⅛ inch long polyester fibers. The mixture is heated, to provide a worm-shaped bait product with higher tensile strength than that of Examples 1–3.

EXAMPLE 5

A slurry containing 67.5 parts propylene glycol, 22.5 percent hydroxypropyl methylcellulose (as described in Example 1) and 10 parts fish attractant (as described in Example 1) is prepared by thoroughly blending the components. The mixture is fed into a 2½ inch extruder equipped with a mandril to extrude a product in tubular form. The extruder there contained three melting zones operated at 110° C., as well as two dies operated at 115° and 93° C., respectively. The tubing, thus prepared, had an outside diameter of 5/32 inch, and inside diameter of 3/32 inch and a weight at 266 g/ft.

The tube is cut into two three-inch portions. Into each of these tube portions is inserted a fish hook so that the shank of the hook is encased in the tubing. The coated hooks are then attached to an open wing stirrer and rotated in a 32-ounce jar of water at 10 to 12 rpm. The submerged tubing lasts 3 hours before dissolving.

EXAMPLE 6

A bait is prepared by adding 0.5 parts ammonia acetate to 30 parts propylene glycol. The mixture is stirred while adding 10 parts of the hydroxypropyl methylcellulose of Example 1. Stirring is maintained, while adding 2.5 parts attractant and 0.2 parts sodium ascorbate. Finally, 2.5 parts of ground cellulose filler is added with stirring. The mix is the consistency of applesauce. To a compression molding device suitable for providing a 10 inch by 10 inch by 0.5 inch sheet, a layer of the bait mix is added. The layer of mix is topped with a sized piece of nonwoven polyester scrim. Another layer of the mix is added and topped with another layer of scrim. The mix is heated in the mold for 2 minutes at 170° C. After cooling, 1.5 g sample of the sheet is tested for solubility rates in ocean water at 4° C. using Automated Dissoette equipment, made by Hanson Research Company. The results are provided in Table I.

TABLE I

| Time (Hours) | Dissolution of Bait (Percent of Attractant Released) |
| --- | --- |
| 2 | 30 |
| 4 | 50 |
| 6 | 60 |
| 8 | 70 |
| 10 | 75 |
| 12 | 85 |
| 14 | 95 |
| 16 | 97 |
| 17 | 100 |

The example illustrates the sustained release effectiveness of a compression molded anhydrous artificial bait.

What is claimed is:

1. A sustained release anhydrous artificial bait for fish and other water-living animals, said artificial bait comprising
   (a) a normally solid polymeric material comprising
      (i) a matrix-forming amount of water-soluble polymer composition and
      (ii) an effective amount of a plasticizer therefore; and
   (b) a functionally effective amount of an attractant for said fish or other water-living animal.
2. The artificial bait of claim 1 wherein the water-soluble polymer is a cellulose ether.
3. The artificial bait of claim 2 wherein the water-soluble polymer is hydroxypropyl methylcellulose.
4. The artificial bait of claim 3 wherein the hydroxypropyl methylcellulose has a hydroxypropoxyl content of 7 to 32 percent and a methoxyl content of 16 to 30 percent.
5. The artificial bait of claim 4 wherein the plasticizer is ethylene glycol or propylene glycol.
6. The artificial bait of claim 5 wherein the hydroxypropyl methylcellulose has a methoxyl content of 16.5 to 20 percent and a hydroxypropoxyl content of 23 to 32 percent.
7. The artificial bait of claim 1 wherein the fish attractant comprises from about 2 to about 20 weight percent of said artificial bait.
8. The artificial bait of claim 6 wherein the plasticizer comprises from about 40 to 80 weight percent of the combined weight of plasticizer and cellulose ether.
9. The artificial bait of claim 6 further comprising a flexible substrate.
10. The artificial bait of claim 6 which is in the form of a natural prey of the fish or other water-living animal.
11. The artificial bait of claim 1 which is in the form of a hollow tube.
12. The artificial bait of claim 6 which bait further comprises a fibrous filler and which bait is formed into the shape of an elongated cylinder.
13. The artificial bait of claim 1 which bait is in the form of an elongated cylinder having a diameter of about ⅛ to 1 inch.
14. The artificial bait of claim 1, wherein the cellulose ether is temporarily crosslinked with a dialdehyde.
15. The artificial bait of claim 6, wherein the hydroxypropyl methylcellulose is temporarily crosslinked with glyoxal.
16. The artificial bait of claim 1, wherein said water-soluble polymer is a polyvinyl alcohol.
17. A sustained release anhydrous artificial bait for fish or other water-living animal comprising
   (a) a normally solid polymeric material comprising
      (i) a matrix-forming amount of a non-thermoplastic water-soluble cellulose ether composition, and
      (ii) an effective amount of a temperature-activated plasticizing solvent for said cellulose ether; and
   (b) a functionally effective amount of an attractant for fish or other water-living animal, wherein said attractant can be released in active form upon immersing said bait in water.
18. The artificial bait of claim 17, wherein said cellulose ether is a hydroxypropyl methylcellulose ether having a hydroxypropyl content of about 7 to about 32 percent and a methoxyl content of about 16 to about 30 percent.
19. The artificial bait of claim 18, wherein said plasticizing solvent is propylene glycol.
20. The artificial bait of claim 19 in the form of an elongated cylinder having a diameter of about ⅛ to about 1 inch.
21. The artificial bait of claim 20 prepared by extruding said bait at a temperature at which said solvent plasticizes said cellulose ether and less than that at which said attractant decomposes.

* * * * *